(12) United States Patent
Martinich

(10) Patent No.: US 12,240,037 B2
(45) Date of Patent: Mar. 4, 2025

(54) INSTALLATION FOR ADDITIVE MANUFACTURING BY SLM OR SLS

(71) Applicant: AMPRO INNOVATIONS PTY LTD, Notting Hill (AU)

(72) Inventor: Jack Martinich, Notting Hill (AU)

(73) Assignee: AMPRO INNOVATIONS PTY LTD, Notting Hill (AU)

( * ) Notice: Subject to any disclaimer, the term of this patent is extended or adjusted under 35 U.S.C. 154(b) by 0 days.

(21) Appl. No.: 17/776,434

(22) PCT Filed: Nov. 9, 2020

(86) PCT No.: PCT/AU2020/051219
§ 371 (c)(1),
(2) Date: May 12, 2022

(87) PCT Pub. No.: WO2021/092646
PCT Pub. Date: May 20, 2021

(65) Prior Publication Data
US 2022/0402034 A1    Dec. 22, 2022

(30) Foreign Application Priority Data
Nov. 12, 2019  (AU) .............................. 2019904257

(51) Int. Cl.
*B22F 10/28* (2021.01)
*B22F 10/32* (2021.01)
(Continued)

(52) U.S. Cl.
CPC .............. *B22F 10/28* (2021.01); *B22F 10/32* (2021.01); *B22F 12/222* (2021.01); *B22F 12/33* (2021.01);
(Continued)

(58) Field of Classification Search
None
See application file for complete search history.

(56) References Cited

U.S. PATENT DOCUMENTS

2005/0225007 A1* 10/2005 Lai ..................... G05B 19/4099
                                                          425/375
2017/0072468 A1    3/2017 Schilling et al.
(Continued)

FOREIGN PATENT DOCUMENTS

CN       108422661 A     8/2018
CN       108422667 A     8/2018
(Continued)

OTHER PUBLICATIONS

Nichtnennung, A., "English Machine Translation of DE-102016013041-A1." EPO. Espacenet. 2023 (Year: 2023).*
(Continued)

*Primary Examiner* — Farah Taufiq
*Assistant Examiner* — Jonathan B Woo
(74) *Attorney, Agent, or Firm* — Hanley, Flight & Zimmerman, LLC

(57) ABSTRACT

An AM installation utilising SLM or SLS a chamber of a housing with a protective atmosphere, a support structure in the chamber defines an upper horizontal surface on which a laser source is operable for focusing onto predetermined regions of a build area of the plane of the horizontal surface. The laser beam source is operable so areas of each of successive layers of powder material are sintered or fully molten throughout its layer thickness. A dosing device raises successive quantities of powder to the level of the upper surface to enable a re-coater to form the layers. A separable build device unit defines build chamber opening at the upper surface, and includes a lift table and an electric drive by which the lift table is stepwise vertically adjustable so a (Continued)

progressively built component is lowerable into the build chamber.

19 Claims, 9 Drawing Sheets

(51) Int. Cl.
    *B22F 12/00*         (2021.01)
    *B22F 12/33*         (2021.01)
    *B22F 12/57*         (2021.01)
    *B22F 12/67*         (2021.01)
    *B33Y 30/00*        (2015.01)

(52) U.S. Cl.
    CPC .............. *B22F 12/38* (2021.01); *B22F 12/57* (2021.01); *B22F 12/67* (2021.01); *B33Y 30/00* (2014.12)

(56) References Cited

U.S. PATENT DOCUMENTS

| | | | |
|---|---|---|---|
| 2017/0136545 A1* | 5/2017 | Yoshimura | B22F 10/22 |
| 2018/0133962 A1* | 5/2018 | Stammberger | B29C 64/153 |
| 2020/0061915 A1 | 2/2020 | Pawliczek | |
| 2020/0079012 A1 | 3/2020 | Pawliczek | |
| 2020/0101669 A1* | 4/2020 | Okazaki | B22F 10/73 |
| 2020/0215612 A1 | 7/2020 | Pieger | |
| 2020/0238613 A1* | 7/2020 | Shi | B29C 64/393 |
| 2020/0254524 A1 | 8/2020 | Pieger et al. | |
| 2020/0254526 A1 | 8/2020 | Huber et al. | |
| 2021/0187847 A1* | 6/2021 | Smith, III | B29C 64/268 |

FOREIGN PATENT DOCUMENTS

| | | | | |
|---|---|---|---|---|
| CN | 110548872 A | 12/2019 | | |
| DE | 102009029765 A1 | * 12/2010 | ............ | B22F 3/1055 |
| DE | 202016007091 U1 | 1/2017 | | |
| DE | 102016225124 A1 | 6/2017 | | |
| DE | 102016013041 A1 | * 5/2018 | | |
| DE | 102016014513 A1 | 6/2018 | | |
| EP | 3632592 A1 | 4/2020 | | |
| WO | 2021092646 A1 | 5/2021 | | |

OTHER PUBLICATIONS

Herzog F. "English Machine Translation of DE-102009029765-A1." EPO. Espacenet. 2023. (Year: 2023).*
International Searching Authority, "International Search Report" issued in connection with International Application No. PCT/AU2020/051219, issued on Nov. 30, 2022, 6 Pages.
International Searching Authority, "Written Opinion" issued in connection with International Application No. PCT/AU2020/051219, issued on Nov. 30, 2022, 7 Pages.
IP Australia, "Examination Report 1," issued in connection with Australian Patent Application No. 2020382765, dated Jul. 28, 2021, 4 pages.
IP Australia, "Notice of Acceptance of Patent Application," issued in connection with Australian Patent Application No. 2020382765, dated Dec. 13, 2021, 3 pages.
IP Australia, "Notice of Grant," issued in connection with Australian Patent Application No. 2020382765, dated Apr. 7, 2022, 1 page.
IP Australia, "International-type search for provisional patent application," issued in connection with Australian Patent Application No. 2019904257, dated Oct. 22, 2020, 24 pages.

* cited by examiner

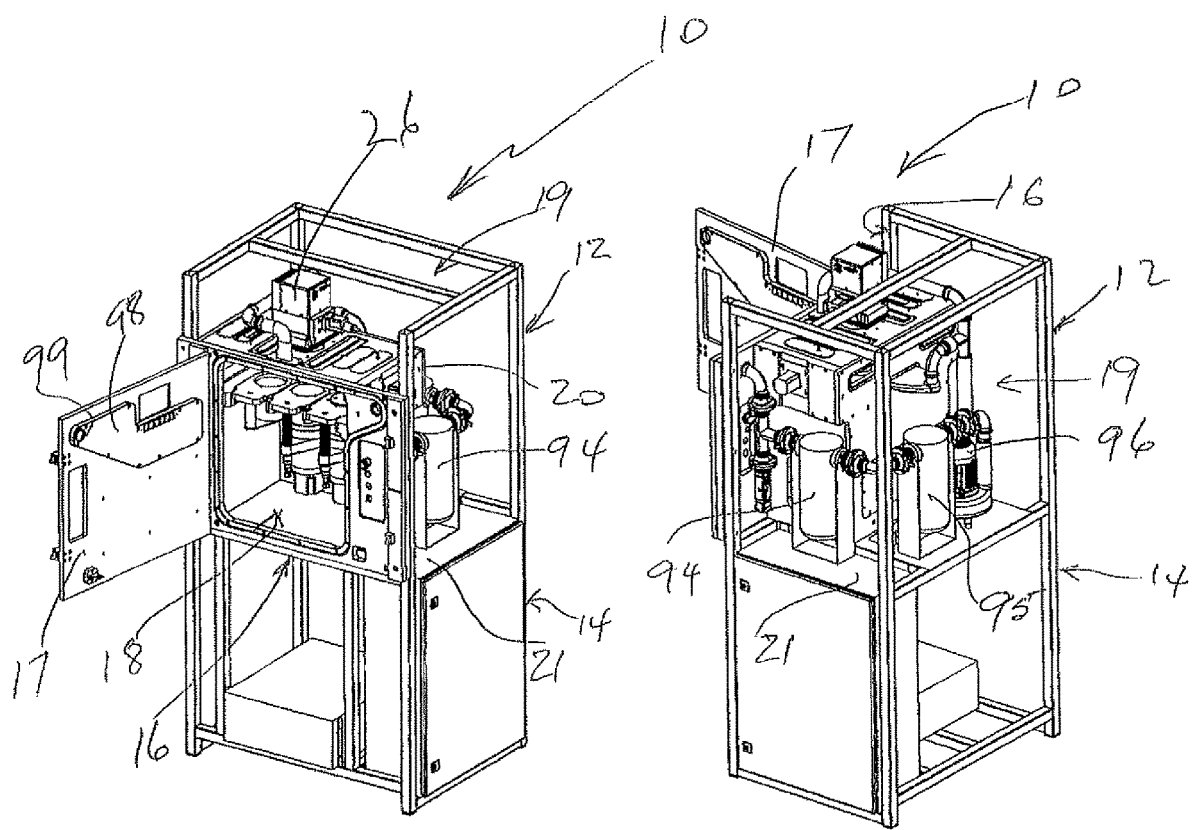
FIG 1  FIG 2

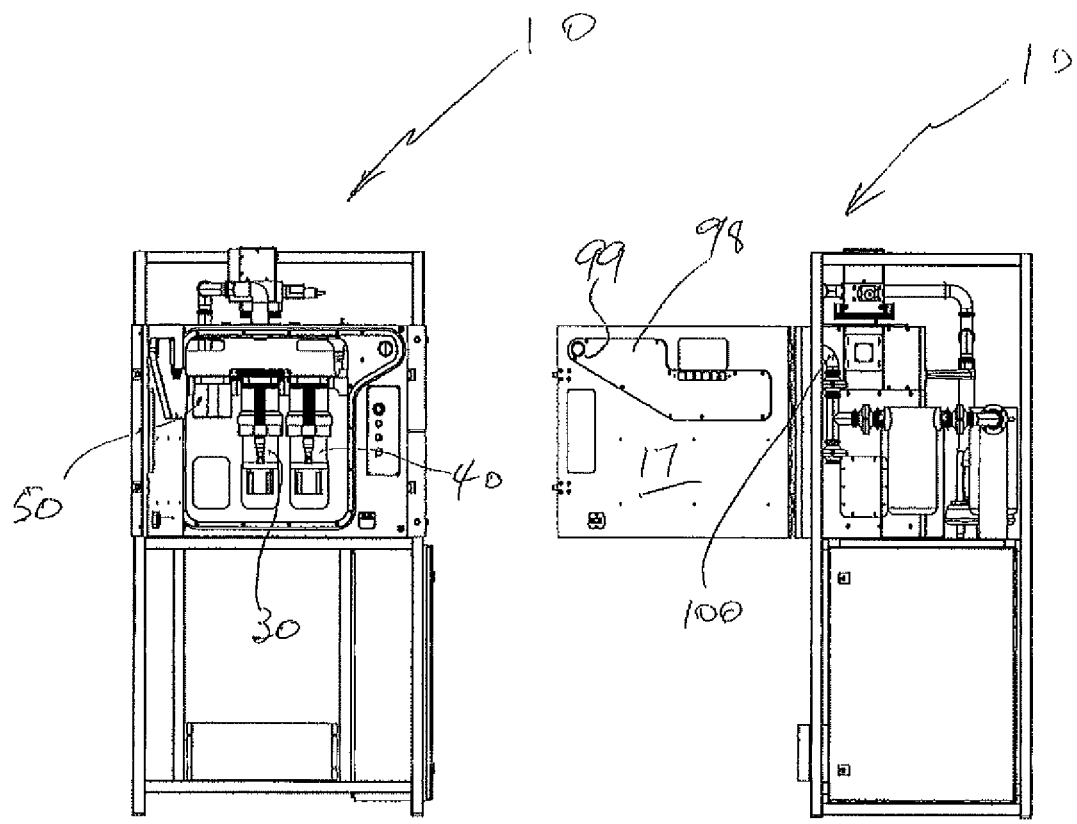
FIG 3  FIG 4

INSTALLATION FOR ADDITIVE MANUFACTURING BY SLM OR SLS

FIELD OF THE INVENTION

The present invention relates to an installation for use in additive manufacturing. The invention primarily is intended for use melting (SLM) and, while largely described herein with reference to SLM, it is to be appreciated that the installation of the invention also is suitable for use in the manufacture of components are articles by selective laser sintering (SLS).

BACKGROUND TO THE INVENTION

An early method for additive manufacturing of metal components now referred to as selective laser melting (SLM) is disclosed in U.S. Pat. No. 6,215,093 to Meiners et al., assignors to Fraunhofer-Gesellschaft. In the method successive layers of metallic powder are deposited or formed one on top of the other and, utilising three-dimensional CAD data of a model, the powder is melted in successive stages by a focused laser beam applied to a given area in each layer corresponding to a selected cross-sectional area of the model before depositing the next layer, such that the heated area of each layer is rapidly solidified and fixed to the preceding layer below. The energy of the laser beam is chosen so the layer of metallic powder is fully molten throughout its layer thickness at the point of contact by the laser beam, and the beam is guided across the given area in several runs so each run partly overlaps the preceding run. Throughout the method a protective atmosphere provided by a laminar flow of gas is maintained above the interaction of the laser beam with the metallic powder. In line with more recent installations for the production of components by SLM, the method is conducted in a process chamber defined in an upper sub-housing of an installation, by the successive layers of metallic powder deposited or formed across a plane extending over the bottom of the process chamber. Between each stage a build, comprising a progressively forming component being produced by the additive manufacturing method, is lowered stepwise on a lift table, or build plate into a build chamber within a lower sub-housing of the installation. Simultaneously, metallic powder in a storage container within the lower sub-housing is raised stepwise on another lift table to provide successive quantities of the powder at a suitable location in the process chamber from which a re-coater device can be operated to form successive layers of powder.

A wide variety of SLM installations has become commercially available in the decades since the method invented by Meiners et al. In large part, these have progressively increased in size to enable the production larger components or, to reduce the unit cost, to enable simultaneous production of a larger number of smaller components. While the patent literature has increased very substantially, many subsequent inventions share much in common with the method and installation of Meiners et al. However there has been a parallel development of more compact installations, suitable for the manufacture of small components such as jewellery and dental prostheses, either individually or a few in each production cycle; or to reduce the area of powder layers required in each stage; or to enable the use of less complex working arrangements for both lowering the build or supplying powder and forming the powder layers; or to overcome some other perceived problem. One such proposal enabling a more compact arrangement is disclosed in European patent EP 2,732,890 to Micheletto (assignor to Sisma S.p.A.).

The invention of Micheletto enables a more compact installation that permits interchangeability. In the context of terminology used in for the invention of Meiners et al., the Micheletto installation has a process chamber in an upper sub-housing. The bottom of the sub-housing, that defines a plane over which successive layers of powder are formed, is defined by a narrow upper shelf that extends side-to-side in the installation and that is mounted on supports so as to be laterally adjustable. The shelf has first and second depending sleeves, each with a lift table. The first sleeve and its lift table are to hold a supply of metallic powder that is raised stepwise to introduce successive quantities of the metallic powder into the process chamber at a suitable location above the shelf. The second sleeve and its lift table provide a build chamber into which a build comprising a progressively formed component can be lowered stepwise. The shelf also defines an opening into which is received excess powder spread by a re-coater device from the first sleeve, to and beyond the second sleeve. A respective electric drive by which the lift table of the first sleeve is raised step-wise, and by which the lift table of the second sleeve is the build is lowered step-wise in the build chamber, each comprises a depending worm screw driven by an electric motor contained below a lower plate mounted in a lower sub-housing of the installation. An upper end of each worm screw is connected the respective lift table by a bolt arrangement that enables the lift table to be disconnected to permit the worm screw to be drawn down by the electric motor. With the worm screws disconnected the shelf can be moved laterally on its supports so that the depending sleeves are accessible. Each tilt table then can be removed to enable insertion of a respective liner with a smaller lift table, after which the shelf can be moved back to its in-use position and the worm screws then connected to the smaller lift tables. The arrangement enables the installation to operate with the first sleeve able to accommodate a reduced volume of metallic powder and the second sleeve containing a build chamber of correspondingly reduced volume. Thus, the installation can be adjusted between arrangements suitable to produce larger or smaller components, respectively, with utilisation of costly metallic powder kept to a minimum suitable for each arrangement and a resultant reduction of waste. However, this facility comes at the cost of considerable structural complexity, as well as a loss of the ability ton use the installation during down-time required for a change over, particularly if the installation is to be cleaned to enable a change in powder type for a next cycle of operation.

U.S. Pat. No. 7,351,051 to Hagiwara (assignor to Aspect Inc.) proposes something akin to the nesting arrangement of Micheletto. This is based on a smaller assembly of three sleeves depending from a common plate that is able to be inserted down from the top into a larger assembly of an installation, with a selection made for each pair of sleeves from respective pair of nested lift tables mounted on a common drive shaft. Access to the installation for insertion or retraction of the smaller assembly is not evident, nor is access for choosing between the pairs of lift tables, and there would seem to be considerable difficulty in each case.

The present invention seeks to provide an installation for use in additive manufacturing, utilising SLM or SLS, that is suitable for manufacture in either a compact form, or on a larger scale, and that facilitates adaptation enabling a change in metallic powder composition from one production cycle to the next and/or a change facilitating more economic metallic powder utilisation in changing from one build scale to another.

BROAD DESCRIPTION OF THE INVENTION

In a first aspect, the present invention provides a unitary build device that is mountable within an enclosure of an installation for use in additive manufacturing of a component in accordance with three-dimensional CAD data of a model of the component, utilising SLM or SLS, wherein the unitary device has a build body that defines an open topped main build chamber, the build body being releasably engageable with a support structure within the enclosure so as to extend below a build area of a substantially horizontal plane defined by an upper surface of the support structure with the open topped main build chamber opening through the support structure at the upper surface, the build device including a build lift table contained in the main build chamber and further including an electric drive build motor by which the build lift table is able to be adjusted vertically in a stepwise manner whereby a component progressively being built layer by layer in the course of an SLM or SLS production cycle is able to be lowered into the main build chamber; and wherein the build body is cylindrical and comprises upper and lower build parts in end-to-end co-axial relationship, the build lift table is movable in an upper build receiving bore that defines a build receiving chamber in a part of the main build chamber in the upper build part of the build body and that is larger than a lower bore in a part of the main build chamber in the lower build part, the motor is mounted coaxially to the lower build part at a lower end of the build body with a threaded shaft of the build motor extending centrally within the lower build part and in threaded engagement with a build piston head, and wherein the build lift table and the build piston head are connected to a respective end of a sleeve element receivable within the lower bore, whereby the motor is operable to move the build piston head axially within the lower build part and thereby correspondingly move the build lift table axially between upper and lower ends of the build receiving bore of the upper build part.

In a second aspect, the invention provides a unitary dosing device that is mountable within an enclosure of an installation for use in additive manufacturing of a component in accordance with three-dimensional CAD data of a model of the component, utilising SLM or SLS, wherein the unitary device has a dosing body defining an open topped dosing chamber for containing a supply of metallic powder, the dosing body being releasably engageable with a support structure within the enclosure so as to extend below a location spaced from a build area a build area of a substantially horizontal plane defined by an upper surface of the support structure such that the open topped dosing chamber opens through the support structure at the upper surface, the dosing device including a powder lift table contained in the dosing chamber and further including an electric drive dosing motor by which the dosing lift table is able to be adjusted vertically in a step-wise manner whereby successive quantities of metallic powder in the dosing chamber can be raised to the level of the upper surface at the open top of the dosing chamber to enable the re-coater device to form a respective layer of powder over the upper surface from each quantity of powder raised to the upper surface; wherein the dosing body is cylindrical and comprises upper and lower dosing parts in end-to-end co-axial relationship, the powder lift table is movable in an dosing bore of the upper dosing part of the dosing body with the dosing bore of the upper dosing part larger than a lower dosing bore of the lower dosing part, the dosing motor is mounted coaxially to the lower dosing part at a lower end of the dosing body with a threaded shaft of the dosing motor extending centrally within the lower dosing part and in threaded engagement with a dosing piston head, and wherein the lift table and the piston head are connected at respective ends of sleeve member slidable into and from the lower part, whereby the motor is operable to move the piston head axially within the lower dosing part and thereby correspondingly move the dosing lift table axially with the upper dosing part.

The invention also provides an installation for use in additive manufacturing of a component in accordance with three-dimensional CAD data of a model of the component, utilising SLM or SLS, wherein the installation includes one of:
(i) a unitary build device according to the first aspect,
(ii) a unitary device according to the second aspect, or
(iii) a respective unitary device according to each of the first and second aspect.

In a first form, the installation of the invention includes:
(a) an enclosure within and throughout which a protective atmosphere can be maintained during a cycle for production of the component,
(b) a support structure that is mounted within the enclosure, intermediate of and spaced from top and bottom levels of the enclosure, and that defines an upper surface disposed in a substantially horizontal plane,
(c) a laser beam radiation source operable for focusing a laser beam down onto predetermined regions of a build area of the horizontal plane, and
(d) a re-coater device operable to form successive layers of metallic powder over an area of the upper surface containing the build area;
wherein the arrangement is such that the laser beam source is operable to apply a focused laser beam, to each of the successive layers of powder in turn before formation of the next layer, in a given part of the build area corresponding to a respective selected cross-sectional area of a model of the component before formation of the next layer, such that the heated area of each layer is sintered or fully molten throughout its layer thickness at the point of contact by the laser beam and then able to rapidly solidify and fix to the preceding layer below to form a respective layer of the component being built;
the installation further including:
(e) a unitary build device that is mounted within the enclosure, intermediate of the top and bottom levels, the build device having a build body that defines an open topped main build chamber, the build body being releasably engaged with the support structure so as to extend below the horizontal plane from the build area with the open topped main build chamber opening through the support structure at the upper surface, the build device including a build lift table contained in the main build chamber and further including an electric drive build motor by which the build lift table is able to be adjusted vertically in a stepwise manner whereby a component progressively being built layer by layer is able to be lowered into the main build chamber, wherein the build body is cylindrical and comprises upper and lower build parts in end-to-end co-axial relationship, the build lift table is movable in an upper build receiving bore that defines a build receiving chamber in a part of the main build chamber in the upper build part of the build body and that is larger than a lower bore in a part of the main build chamber in the lower build part, the motor is mounted coaxially to the lower build part at a lower end of the build body with a threaded shaft of the build motor extending centrally within the lower build part and in threaded engagement with a build piston head, and wherein the build lift table and the build piston head are connected to a respective end of a sleeve element receivable within the lower bore, whereby the motor is operable to move the build piston head axially within the lower build part and thereby correspondingly move the build lift table axially between upper and lower ends of the build receiving bore of the upper build part.

In a second form, the installation of the invention includes:

(a) an enclosure within and throughout which a protective atmosphere can be maintained during a cycle for production of the component, (b) a support structure that is mounted within the enclosure, intermediate of and spaced from top and bottom levels of the enclosure, and that defines an upper surface disposed in a substantially horizontal plane, (c) a laser beam radiation source operable for focusing a laser beam down onto predetermined regions of a build area of the horizontal plane, and (d) a re-coater device operable to form successive layers of metallic powder over an area of the upper surface containing the build area;

wherein the arrangement is such that the laser beam source is operable to apply a focused laser beam, to each of the successive layers of powder in turn before formation of the next layer, in a given part of the build area corresponding to a respective selected cross-sectional area of a model of the component before formation of the next layer, such that the heated area of each layer is sintered or fully molten throughout its layer thickness at the point of contact by the laser beam and then able to rapidly solidify and fix to the preceding layer below to form a respective layer of the component being built;

the installation further including:

(e) a unitary dosing device that is mountable within an enclosure of an installation for use in additive manufacturing of a component in accordance with three-dimensional CAD data of a model of the component, utilising SLM or SLS, wherein the unitary device has a dosing body defining an open topped dosing chamber for containing a supply of metallic powder, the dosing body being releasably engageable with a support structure within the enclosure so as to extend below a location spaced from a build area a build area of a substantially horizontal plane defined by an upper surface of the support structure such that the open topped dosing chamber opens through the support structure at the upper surface, the dosing device including a powder lift table contained in the dosing chamber and further including an electric drive dosing motor by which the dosing lift table is able to be adjusted vertically in a step-wise manner whereby successive quantities of metallic powder in the dosing chamber can be raised to the level of the upper surface at the open top of the dosing chamber to enable the re-coater device to form a respective layer of powder over the upper surface from each quantity of powder raised to the upper surface; wherein the dosing body is cylindrical and comprises upper and lower dosing parts in end-to-end co-axial relationship, the powder lift table is movable in an dosing bore of the upper dosing part of the dosing body with the dosing bore of the upper dosing part larger than a lower dosing bore of the lower dosing part, the dosing motor is mounted coaxially to the lower dosing part at a lower end of the dosing body with a threaded shaft of the dosing motor extending centrally within the lower dosing part and in threaded engagement with a dosing piston head, and wherein the lift table and the piston head are connected at respective ends of sleeve member slidable into and from the lower part, whereby the motor is operable to move the piston head axially within the lower dosing part and thereby correspondingly move the dosing lift table axially with the upper dosing part.

Preferably each unitary device is able to be engaged in, or lifted from, the enclosure by the body of the device engaging with, or disengaging from, the support structure without any requirement for reassembly or disassembly of the unitary device other than to connect or disconnect any external power supply for actuating the build motor Preferably the sleeve element or the sleeve member by which the respective lift table and piston head are connected, has a flange around its end adjacent to the lift table, with piston rings provided on the flange operable to seal against the passage of powder beyond the respective lift table.

The build device separable as a unified build assembly and similarly, if provided, the dosing device separable as a unified dosing assembly, may have a tubular body defining a through bore along which the contained lift table is able slide in the manner of a piston. Under the action of the electric drive, the lift table is able to slide between an end of the bore defining an opening at the horizontal plane and an end remote from the opening, with the motor mounted at or in the remote end of the tubular body. The motor has an output shaft connected to the lift table extends axially along the bore to extend from or retract to the motor for sliding the lift table. The bore may be rectangular, with the lift table having a periphery that also is rectangular, although a circular bore and lift table is preferred as it facilitates the provision of a peripheral seal around the lift table to minimise leakage of powder past the lift table. The motor may be of any suitable form but preferably is a stepper. To facilitate separation of a device as a unified assembly having a drive comprising an electric motor powered by an external electric power source, power supply leads for the motor preferably are provided with a plug that can be disconnected from a socket in the housing of the installation to which electric power is supplied from an external source. However, the electric motor may have a battery pack, obviating the need for such power leads and plug. In each case the motor may be driven by a servo drive, to stepwise rotate the output shaft to advance or retract the lift table.

At a second location spaced beyond the build area in a direction away from the first location in the first form of the first aspect of the invention, the installation may, and most preferably does, have an open topped vessel that defines an overflow chamber. The vessel is mounted in relation to the support structure within the main chamber, intermediate of the top and bottom levels, such that the overflow chamber extends below the support structure. The open top of the overflow vessel is in the horizontal plane such that powder surplus to requirements in the re-coater forming each of successive layers of powder over the upper surface to the second location is received into the overflow chamber. The mounting of the overflow chamber in relation to the support structure preferably is such that the overflow chamber is separable from the installation, such as to enable it to be emptied or replaced by another overflow chamber, such as in the event of a change of powder to be used in a next component build cycle.

Each of units comprising the dosing device, the build device and, where provided, the overflow chamber may be mounted in relation to the support structure in a number of different ways, in each of which the unit is mounted in relation to the support structure as a unified build assembly that is able to be separated from the support structure for removal from the housing of the installation. In each case an upper extent of the unit may be inserted upwardly through an opening through a shelf comprising a part of the support structure that has an upper surface defining the horizontal plane, following which a respective or common support comprising a further part of the support structure may be positioned below the unit to retain it is position. In an alternative arrangement, the support comprises a shelf that has an upper surface that defines the horizontal plane, but with the shelf having a respective U-shaped opening for each unit along a side of the shelf such that an upper extent of each unit is laterally receivable into a respective opening. Each unit may be secured in the respective opening by a locking element of a clamp that extends across the opening. Alternatively, each opening may be larger than the upper extent of the respective unit it is to receive, with the upper extent of the unit having a collar that is a neat fit in the opening such that an upper surface of each collar is in the horizontal plane.

The build device separable as a unified build assembly may have a handle by which it is manually manoeuvrable to be released from, and returned to, its mounting in relation to the support structure. Similarly, the dosing device if separable as a unified dosing assembly may have a handle by which it is so manoeuvrable, while the same applies to the overflow chamber in that it also may have a handle. However, for larger installations, the weight of the build device, the dosing device and even the overflow chamber may be such that they can not be manually handled with safety. With such larger installation, a respective fitting engageable by a mechanical or electrical lift device may be provided instead of a handle.

In a second aspect of the invention provides a re-coater system that includes the re-coater device, operable to form successive layers of metallic powder over the area of the upper surface containing the build area. The re-coater system, which may be used in the first aspect of the invention, includes a carriage from which the re-coater device depends, a rail system along which the carriage is movable and a drive system by which the carriage is movable in one or other direction, as required, along the rail system. The arrangement is such that, with the drive system moving the carriage in one direction along the rail system, the re-coater device is moved with the carriage from a start position to move powder along the upper surface of the support structure and thereby form a layer of powder over the upper surface, including the build area, and with the drive system moving the carriage in the other direction, the re-coater device is returned to the start position.

The re-coater system is mountable in an upper extent of the housing, over the upper surface of the support structure. The re-coater system preferably is at a level between the level of the upper surface of the support structure and level of the laser beam radiation source. The arrangement is such that the re-coater device is able to pass between the radiation source and the build area of the horizontal plane defined by the upper surface of the support structure between periods of operation of the radiation source, so no part of the re-coater system is between the radiation source and the build area while the radiation source is operable to focus a laser beam on predetermined regions of the build area. To enable this, the carriage may be cantilevered over the upper surface of the support structure from a single rail or linear slide comprising the rail system and located to one side of a path traversed by the carriage in its movement along the rail. However, a preferred alternative is for the rail system to have a substantially parallel pair of rails or linear slides with each of the rails or linear guides located to a respective side of the path traversed by the carriage in its movement along the parallel rails or linear slides. In that preferred alternative, the carriage may be mounted in relation to, and extend between, each of the rails or linear slides, with the re-coater device being of elongate form and depending below the carriage to extend from adjacent to one rail or linear slide to adjacent the other rail or linear slide. The re-coater device may have an elongate body along which a wiper blade or element is attached to a lower face of the elongate body. The body may be secured at one of its opposite ends to a side of the carriage adjacent to one rail or linear slide to the carriage so that, over a major part of its length, the body is spaced below the carriage and extends towards the other rail or linear slide. The arrangement is such that the wiper blade or element extends along a side of the body remote from the carriage, and closely adjacent to the upper surface containing or including the build area, to enable the wiper blade or element form a layer of powder over the upper surface and the build area as the drive system moves the carriage in a direction from the dosing device to and beyond the build device.

The drive system of the re-coater system may comprise a stepper motor having a threaded output shaft threadedly engaged with the carriage and extending along and supported for rotation in or on the rail system where the rail system comprises a single rail or linear slide. Where the drive system comprises a parallel pair of rails or linear slides, the drive system may comprise a stepper motor having an output shaft engaged with each of a parallel pair of threaded drive shafts, with each threaded drive shaft threadedly engaged with the carriage and extending along and supported for rotation in or on a respective rail or linear slide of the rail system. With such parallel pair of drive shafts, the linear motor may be mounted on a bracket extending adjacent one end of the rail system, with the output shaft drivingly engaged with each drive shaft by a suitable gear system. In one form the gear system may comprise a gear on the output shaft of the linear motor that is engaged with a respective gear on the end of each drive shaft, either by direct engagement or such as by a toothed drive belt meshing with the gear on the output shaft and the respective gear on each drive shaft.

In the installation of the invention, a protective atmosphere preferably is able to be maintained in the housing by a closed-circuit system for the recirculation, extraction and filtration of protective gas, with the system operable to maintain an atmosphere of protective gas throughout the interior of the housing comprising the main chamber. In one form, the recirculation system enables a flow of protective gas across the build area, between an inlet fitting and an outlet fitting, whereby fume generated in heating of powder of the layer over the build area by the laser beam can be extracted, together with any entrained powder particles, with the fume and entrained particles filtered from the protective gas before the gas is re-circulated within the housing. The circuit includes a blower, by which suction is generated to extract gas from the main chamber through the outlet and circulated, and a filter unit to which gas drawn from the chamber passes to be filtered before being reintroduced to the chamber via the inlet fitting. In passing through the filter unit the gas is filtered to enable gas substantially free of fume and entrained powder particles to be returned to the chamber.

Many proposals for installations for additive manufacture by SLM or SLS, particularly those designed for the manufacture of large to very large components, have an overall housing that includes an upper sub-housing and a lower sub-housing. In large part the upper sub-housing of such installations is given over to providing a large process chamber defined by external walls of the sub-housing, while the lower sub-housing accommodates a build chamber into which is progressively lowered a component being made by operations conducted iteratively in the process chamber. The lower sub-housing also can accommodate some components of the installation, such as parts of a re-circulation system for protective gas, such as a blower and a filter unit, as well as at least some electronic components. In contrast to this arrangement, the present invention has relatively shallow front to rear depth requirements for accommodating the side-by-side spacing of the dosing and build devices, as well as the overflow chamber, if provided. Therefore, the upper sub-housing can comprise a front section forming the housing defining the main chamber in which a protective atmosphere is maintained during a cycle for production of the component. In that case, a rear section of the upper sub-housing can accommodate other components of the installation, with the rear section essentially isolated from the front section and not requiring it also to have a protective atmosphere. Accordingly the arrangement may be such that the system for the recirculation, extraction and filtration of protective gas may maintain the protective atmosphere only in the front section while having components such as the blower and filter unit contained in the rear section and enabling most electronic components to be accommodated in less constrained conditions within the lower sub-housing.

A flow of protective gas across the build area, between respective fittings comprising an inlet fitting and an outlet fitting, most conveniently is provided by the inlet and outlet fittings being spaced across build area in a direction perpendicular to the spacing between the first location and the build area. The housing in which a protective atmosphere is to be maintained has an access opening in one side, typically the front side, and a door movable between an open position enabling access to the interior of the housing and a closed position in which the door covers the access opening to preclude access to the interior. The spacing between the inlet and outlet fittings perpendicular to the spacing between the first location and the build area most preferably is such that either the inlet fitting or the outlet fitting is adjacent to the opening respectively to receive or discharge gas flow across the build area.

An inlet or outlet fitting adjacent to the opening may be in communication with a conduit that forms part of flow path of the closed-circuit system and that extends to or from that fitting adjacent to an upper extent of the access opening. The conduit may have a depending portion that has a lower end on which the fitting is mounted such that the fitting is at an appropriate level for enabling a flow of protective gas across the build area from or to the fitting. If necessary, the conduit may have an axis on which it is rotatable, or the depending portion may be mounted in relation to the conduit so as to swing on that axis, whereby the fitting can be moved away from the opening to facilitate removal and replacement of the build device. The fitting may be manually movable, or the installation may include an adjustment drive device by which the fitting is movable. In an alternative arrangement, the inlet or outlet fitting adjacent to the opening may be mounted on or in relation to the door and movable with the door. In such an alternative the fitting may be in communication with a conduit that forms part of flow path of the closed-circuit system and that extends to or from that fitting across an inner face of the door or within the door, with the conduit able to disconnect from, and reconnect with, an associated part of the closed-circuit system as the door is opened, or closed, respectively.

BROAD DESCRIPTION OF THE DRAWINGS

In order that the invention may more readily be understood, description now is directed to the accompanying drawings, in which:

FIG. 1 is a partial front perspective view of an installation according to the invention;

FIG. 2 is a partial rear perspective view of an installation of FIG. 1;

FIG. 3 is a front elevation of the installation of FIG. 1;

FIG. 4 is a right side elevation of the installation of FIG. 1;

Figure 5:
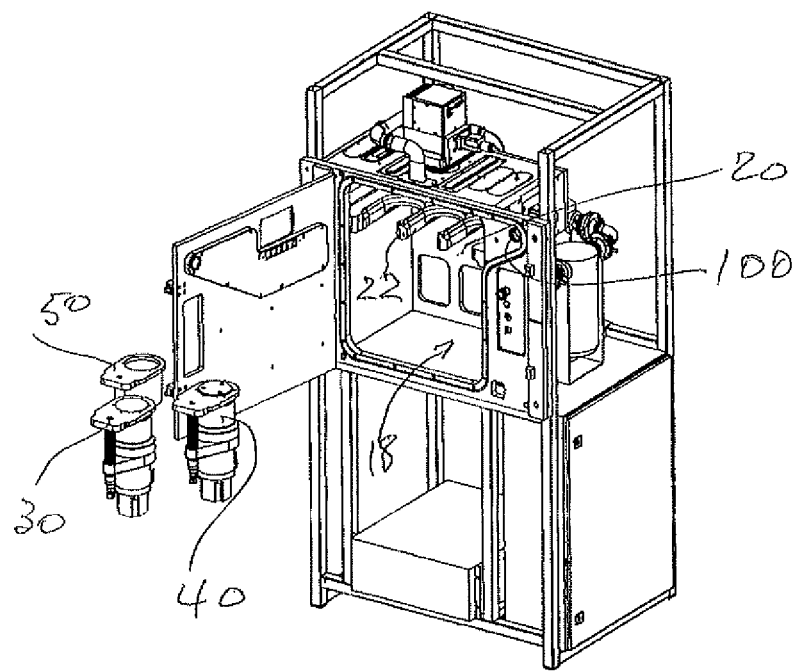
Figure 6:
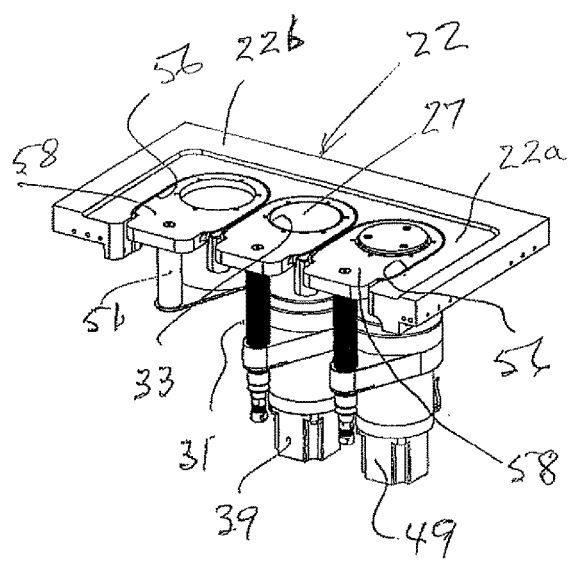
Figure 7:
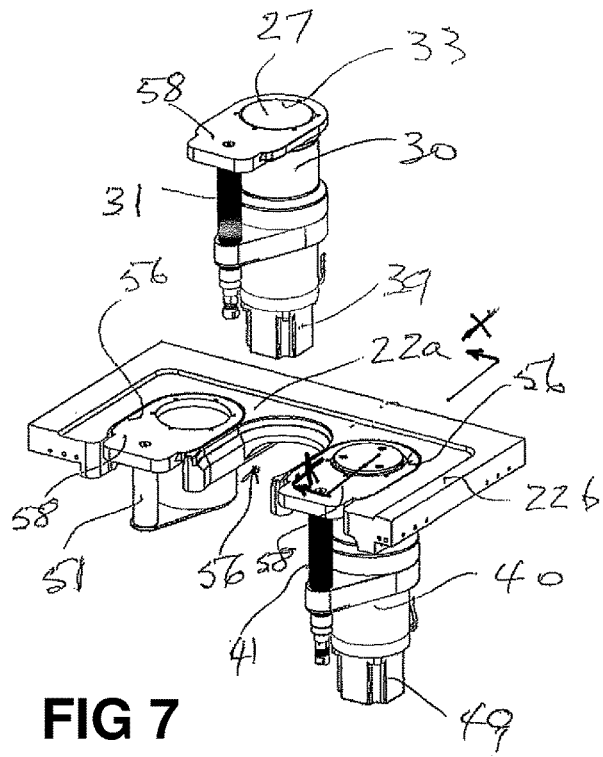
Figure 10:
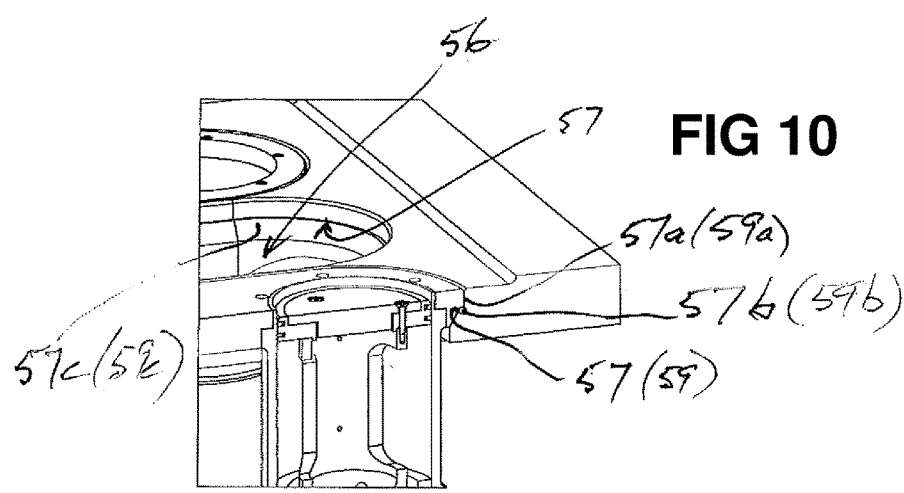
Figures 8, 9:
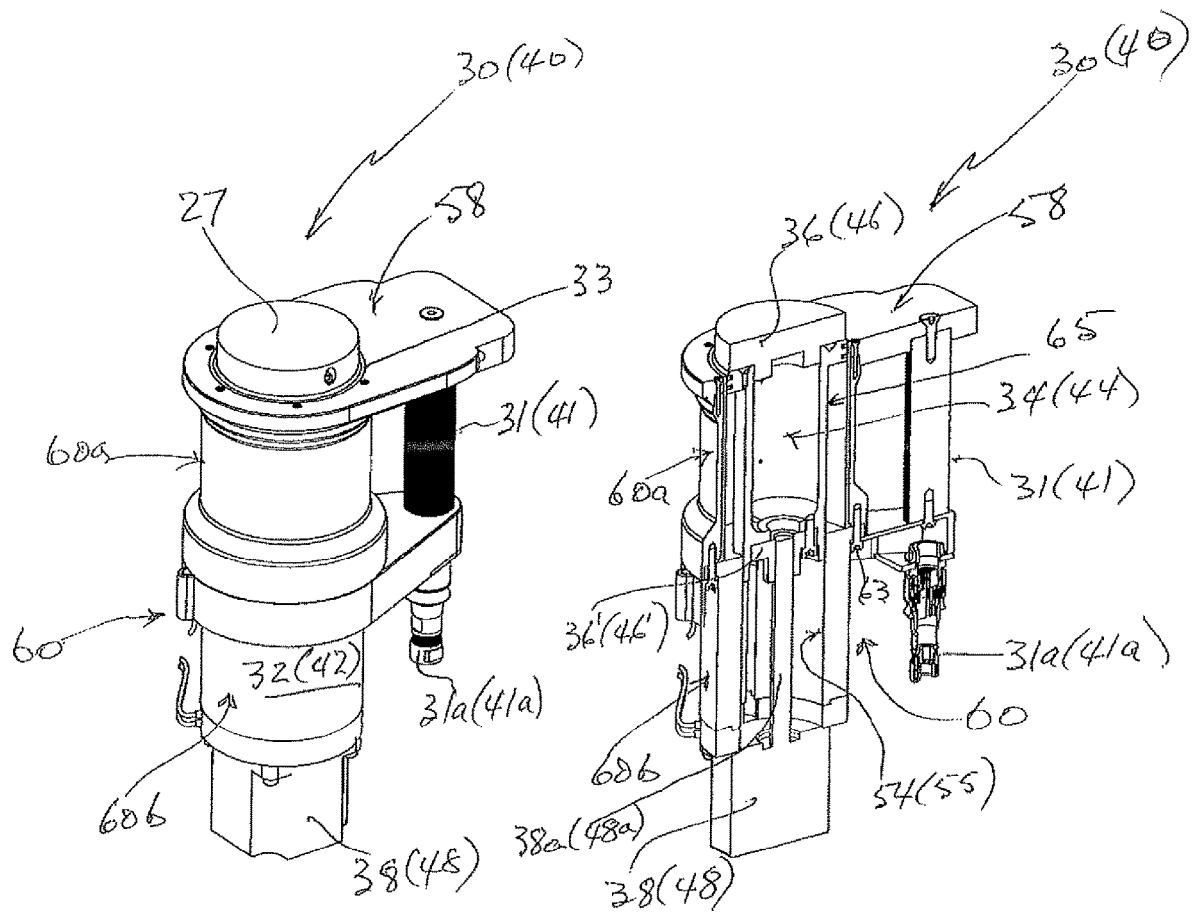
Figure 11:
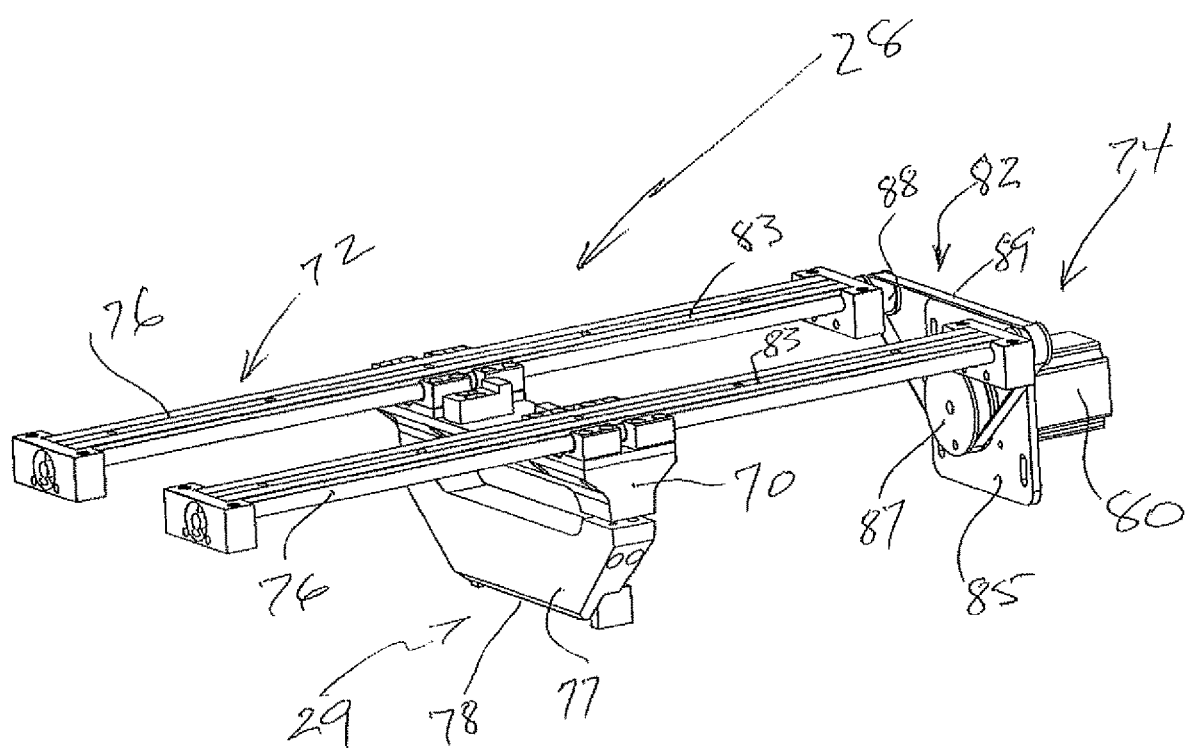
Figure 12:
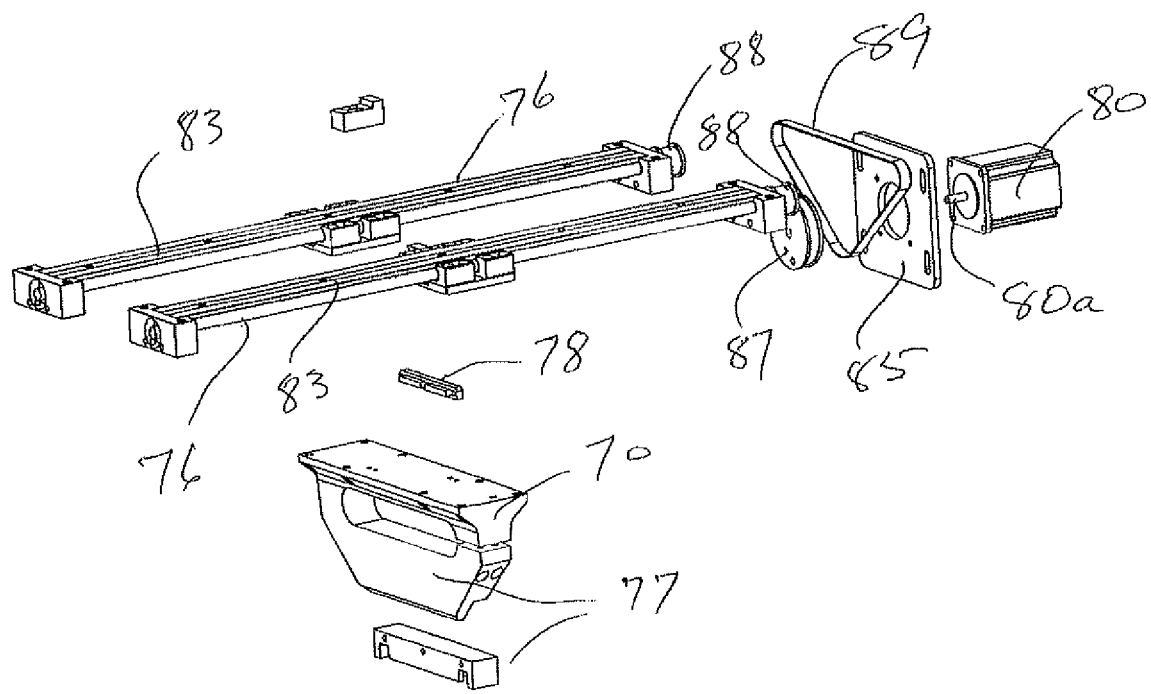
Figure 13:
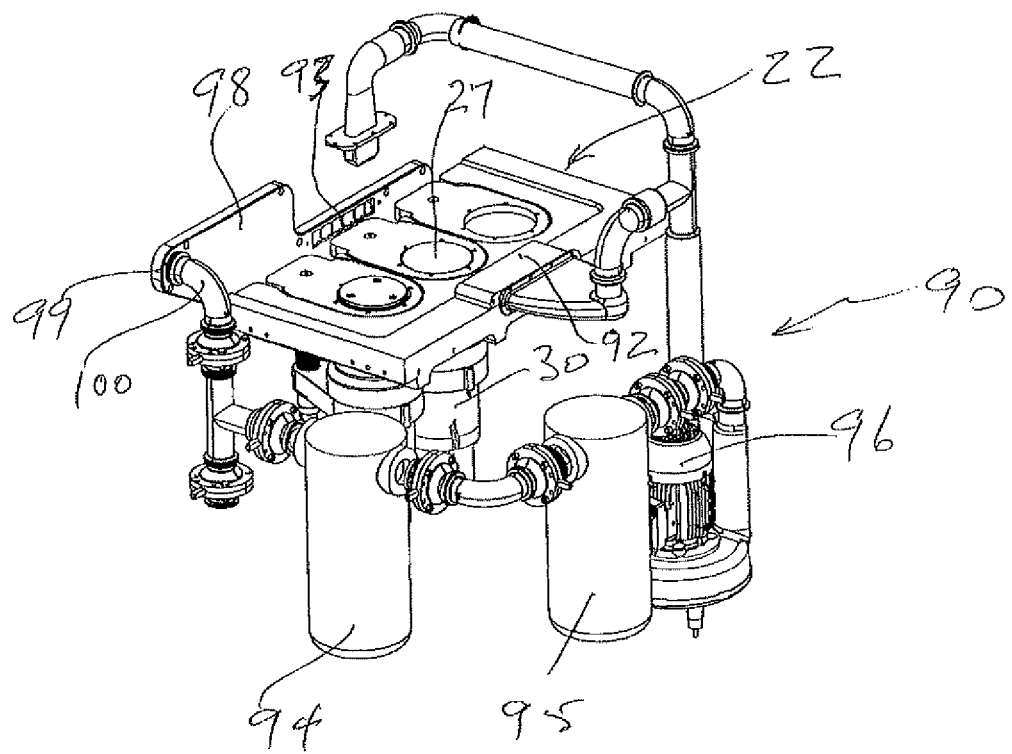
Figure 14:
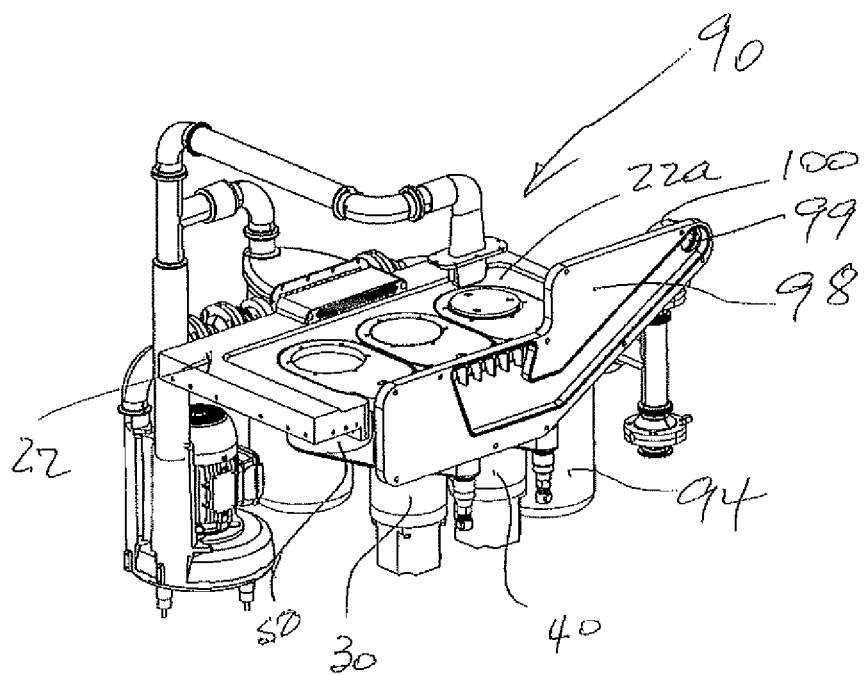

FIG. 5 corresponds to FIG. 1, but shows components as being removed;

FIG. 6 is a perspective view of a first sub-assembly of the installation of FIG. 1;

FIG. 7 corresponds to FIG. 6, but with one component of the first sub-assembly shown as being removed;

FIG. 8 shows the removed component of FIG. 7, in enlarged detail;

FIG. 9 corresponds to FIG. 8, but shows the removed component in section;

FIG. 10 shows on an enlarged scale a part sectional view taken on line X-X of FIG. 7;

FIG. 11 is a perspective view of a second sub-assembly of the installation of FIG. 1;

FIG. 12 is an exploded view of the second sub-assembly of FIG. 11;

FIG. 13 is a rear perspective view of a third sub-assembly of the installation of FIG. 1; and FIG. 14 is a front perspective view of the third sub-assembly of FIG. 13.

DETAILED DESCRIPTION OF THE DRAWINGS

FIGS. 1 to 5 show an installation 10 for use in additive manufacturing of a component (not shown) in accordance with three-dimensional CAD data of a model of the component, utilising SLM or SLS. The installation includes an upper sub-unit 12 and a lower sub-unit 14. The upper sub-unit 12 comprises a front housing 16 that has a front door 17 and defines a main chamber 18 within which a protective atmosphere can be maintained during a cycle for production of the component, and a rear housing 19. The front housing 16 is separated from the rear housing 19 by an upstanding wall 20 extending between opposite sides of the upper sub-unit 12. The upper sub-unit 12 and the lower sub-unit 14 are separated by a horizontal panel 21 therebetween. Also, when the installation 10 is in use, the sub-units 12 and 14 are enclosed on all four sides, by opposed left and right side panels, rear panels and front hinged door panels, while the upper sub-unit 12 is enclosed be a top cover panel. However, some panels have been omitted for ease of illustration.

Within main chamber 18 of the front housing 16, there is mounted a support structure 22 shown most clearly in FIGS. 6 and 7. The support structure 22 is mounted intermediate of top and bottom levels of the front housing 16 and is in the form of a shelf that defines an upper surface 24 disposed in a substantially horizontal plane. Above upper surface 24 there is mounted a laser beam radiation source 26 operable for focusing a laser beam down onto predetermined regions of a build area 27 of the horizontal plane, and a re-coater system 28 (shown in detail in FIGS. 10 and 11) that includes a re-coater device 29 operable to form successive layers of metallic powder (not shown) over an area of the upper surface 24 containing the build area 27. The arrangement is such that the laser beam source 26 is operable to apply a focused laser beam, to each of the successive layers of powder in turn before formation of the next layer, in a given part of the build area 27 corresponding to a respective selected cross-sectional area of the model before formation of the next layer by the re-coater device 29. In this manner, the heated area of each layer is sintered or fully molten throughout its layer thickness at the point of contact by the laser beam and then able to rapidly solidify and fix to the preceding layer below to form a respective layer of the component being built.

Within the main chamber 18, intermediate of the top and bottom levels of front housing 16, a build device 30 is mounted in relation to the support structure 22 at a mid-region along the support structure. The build device 30 (as shown in more detail in FIGS. 6 to 9) has a build body 32 that extends below the horizontal plane from the build area 27 of the horizontal plane. The build body 32 defines an open topped build chamber 34 that opens through the support structure 22 at the upper surface 24, with the periphery 33 of the open top defining the build area 27. The build device 30 includes a build lift table 36 contained in the build chamber 34 and an electric build drive 38 by which the build lift table 36 can be adjusted vertically in a stepwise manner. The arrangement is such that a component progressively being built layer by layer in the build area 27, over the build lift table 36, can be lowered stepwise into the build chamber 36.

Also within the main chamber 18, intermediate of the top and bottom levels of front housing 16, a dosing device 40 is mounted in relation to the support structure 22 at a first location spaced along the support structure 22 to one side of the build device 30. The dosing device 40 is similar in form to the build device 30, and it also is shown in more detail in FIGS. 6 to 9). Thus the dosing device 40 has an elongate dosing body 42 that extends below the horizontal plane, with the dosing body 42 defining an open topped dosing chamber 44 for containing a supply of metallic powder (not shown) and that opens through the support structure at the upper surface 24. The dosing device 40 includes a dosing lift table 46 contained in the dosing chamber 44 and an electric dosing drive 48 by which the dosing lift table 46 is able to be adjusted vertically in a step-wise manner whereby successive quantities of metallic powder in the dosing chamber 44 can be raised to the level of the upper surface 24 at the open top of the dosing chamber 44 to enable the re-coater device 29 to form a respective layer of powder over the upper surface 24 from each quantity of powder raised to the upper surface 24.

At a second location spaced beyond the build area 27 in a direction away from the first location at which the dosing device 40 is mounted, the installation 10 has an open topped overflow vessel 50 that defines an overflow chamber 52. The vessel 50 is mounted in relation to the support structure 22 within the main chamber, intermediate of the top and bottom levels, such that the overflow chamber 52 extends below the support structure 22. The open top of the overflow vessel 50 is in the horizontal plane such that powder, surplus to requirements forming each of successive layers of powder over the upper surface by the re-coater device 29, is received into the overflow chamber 52. The mounting of the vessel 50 to position the overflow chamber 52 in relation to the support structure 22 preferably is such that the vessel 50 is separable from the installation, such as to enable it to be emptied or replaced by another overflow chamber, such as in the event of a change of powder to be used in a next component build cycle.

Each of the build device 30 and the dosing device 40 is mounted in relation to the support structure as a unified assembly that can be separated from the support structure for removal from the housing of the installation. The build device 30 can be removed, such as at the end of the manufacture of a component, with the completed component within the build chamber 34. This enables the build device 30 to be stored outside the installation, such as until the content of the build chamber 34 has cooled sufficiently. If required, a closure may be placed over the periphery 33 open top of the build chamber 34 before the build device 30 is taken out of the protective atmosphere within the main chamber 18 of the front housing 16, with the closure retained on periphery 33 until the content of the build chamber 34 has cooled sufficiently. While the removed build device 30 is cooling, use of the installation 10 can be resumed after installing another build device 30 comprising a unified build assembly, thereby minimising down-time for the installation 10. A replacement build device 30 may be the same as the removed device 30, or it may differ such as in having a build chamber 34 of larger or smaller capacity, subject to the body of the replacement device 30 otherwise having a form enabling it to be appropriately mounted in the housing of the installation in relation to the support structure.

To enable the build device 30 to be separable as a unified build assembly, a handle 31 is provided on the build body 32 to enable the device 30 to be manually manoeuvrable so as to be released from, and returned to, its mounting in relation to the support structure 22. Similarly, the dosing device 40 has a handle 41 on the dosing body 42 for that purpose, while the overflow vessel 50 also has a handle 51. For larger installations, the weight of the build device, the dosing device and even the overflow chamber may be such that they cannot be manually handled with safety and, in that case, the respective body 32 and 42, and the vessel 50, can be provided with a respective fitting able to be engaged by a mechanical or electrical lift device instead of a handle. However, with each of the handles 31 and 41 of the respective devices 30 and 40, the handle has a plug or connector 31a and 41a, respectively, to enable electric motor 38 and 48 to be electrically connected with or disconnected from an electric power source.

The build device 30 is separable as a unified build assembly, as is the dosing device 40. The device 30 has a tubular body 32 defining a through-bore 54 along which the lift table 36 contained in build chamber 34 is able slide in the manner of a piston. Similarly, the device 40 has a tubular body 42 defining a through-bore 55 along which the lift table 46 contained in dosing chamber 44 is able slide in the manner of a piston. Under the action of the respective electric drive motor 38 and 48 of each device 30 and 40, the respective lift table 36 and 46 is able to slide between an end of the bore defining an opening at the horizontal plane and an end remote from the opening, with the motors 38 and 48 mounted at or in the remote end of the respective tubular body 32 and 42. Each motor 38 and 48 has a respective output shaft 39 and 49 that is connected to the lift table 36 and 46 and extends axially along the respective bore 54 and 55 so as to extend from or retract to the motor 38 and 48 for sliding the lift table 36 and 46. While the bore in each body 32 and 42 and the respective lift table 36 and 46 may be rectangular, a circular bore and lift table 36 and 46 is preferred as it facilitates the provision of a peripheral seal around the lift table to minimise leakage of powder past the lift tables 36 ad 46. The motors 38 and 48 may be of any suitable form, such a stepper motor such as a NEMA® 34 servo motor available from Ocean Controls of Carrum Downs, Victoria, Australia. Each of motors 38 and 48 may be driven by a servo drive, to stepwise advance or retract the output shaft 37 and 47 of each motor, such as a LEAD-SHINE™ES-D808 or ES-D1008, each also available from Ocean Controls. To facilitate separation of a device 30 or 40 as a unified assembly, the electric motor 38 or 48 is powered by an external electric power source, power supply leads (not visible in handles 31 or 41) terminating at the plug or connector 31 a or 41 a that can be disconnected from a socket in the installation 10 to which electric power is supplied from an external source. However, each electric motor 38 and 48 may have a battery pack, obviating the need for such power leads and plug.

Each of the build device 30, the dosing device 40 and the overflow vessel 50 is mounted in relation to the support structure 22 as a unified build assembly that is able to be separated from, and re-mounted in relation to, the support structure 22, for removal from and return to the front housing 16 of the installation 10. As shown in FIGS. 6 and 7, the support structure 22 is in the form of a shelf that has a recessed upper surface 22a that defines the horizontal plane and, on the opposite ends and the rear edge that is bordered by a raised margin 22b. Along the length of structure 22, at substantially uniform intervals, there is a series of three U-shaped openings 56, each opening to the front edge of structure 22. Each of openings 56 is of similar form and such that they are respectively able to receive and support the overflow vessel 50, the build device 30 and the dosing device 40. The arrangement is such that vessel 50 and each of devices 30 and 40 is laterally receivable into the respective U-shaped opening 56 and then lowered so as to inter-lock with support structure 22, such that the top of vessel 50, the periphery 33 of the open top of body 32 of device and the open top of 42 of device 40 is in the plane defined by the upper surface 22a of support structure 22. Each of vessel 50, body 32 and body 42 has a collar 58 around its respective open top, with each collar being a neat fit in the respective opening 56 such that an upper surface of each collar 58 also is in the horizontal plane defined by surface 22a of support structure 22. An upper extent below the respective collar 58 of each of vessel 50, body 32 of device 30 and body 42 of device 40 is receivable laterally into the respective opening 56, after which the vessel 50, the device 30 and the device 40 is able to be lowered to secure the mounting.

As shown in FIG. 10, each of openings 56 is bordered by a wall 57 that, extending down from surface 22a, has a substantially vertical upper margin 57a that leads to a substantially horizontal upwardly facing shoulder 57b, with a lower, inclined margin 57c extending from the shoulder 57b, downwardly and outwardly away from upper margin 57a. Each collar 58 has a peripheral wall 59 that, around a portion of wall 59 that co-operates with wall 57, has a form that is complementary to that of wall 57. Thus, extending down from the top of each collar, that portion of wall 59, has a substantially vertical upper margin 59a that leads to a substantially horizontal downwardly facing shoulder 59b, with a lower, inclined margin 59c extending from the shoulder 59b, downwardly and inwardly away from upper margin 59a. The arrangement is such that each of the overflow vessel 50, the build device 30 and the dosing device 40 can be moved into its opening 56 with its collar 58 just above the surface 22a of structure 22, and then lowered to be mounted in relation to structure 22 by inter-fitting the peripheral margins and shoulder of the collar 58 with the margins and shoulder of the opening 56. Also, for full securement, each opening 56 is narrowed slightly across a bight defined at the front edge of support structure 22 to provide projections 56a that co-operate with recesses 58a in each collar 58, such that none of the overflow vessel 50, the build device 30 and the dosing device 40 can be removed without first intentionally being lifted to disengage the respective collar from its opening 56.

As is evident from FIGS. 6 and 7, the build device 30 and the dosing device 40 have a common external form, shown on a larger scale in FIG. 8. They also can have a common a common internal form shown in FIG. 9. While this external and internal commonality is not necessary, it does have several readily apparent benefits. The internal form of FIG. 9 shows the device 30 (or 40) as having a cylinder housing 60 having an upper cylinder part 60a secured in an end-to-end co-axial relationship with a lower cylinder part 60b. The parts 60a and 60b have a similar length, although the upper part 60a has a bore 61 of larger diameter than the bore 62 of the lower part 60b. The parts are secured end-to-end by bolts 63 through a flange around the upper end of lower part 60b engaging in the lower end of upper part 60a. The motor 38 (or 48) is mounted co-axially at the lower end of the cylinder housing 60 with the threaded shaft 38a (or 48a) extending centrally through the length of bore 62 of lower part 60b of housing 60. The shaft 38a (48a) is in threaded engagement with a secondary lift table 36' (or 46') such that motor 38 (48) is stepwise operable to draw the lift table 36' (46') axially within bore 62, in either direction. The secondary lift table 36' (46') is secured in the lower end of a cylinder bore liner sleeve 65 that is able to extend co-axially within the upper part 60a of cylinder housing 60, by bolts 66 through the secondary lift table 36' (46') engaging in an annular flange 67 within the lower end of sleeve 65. The external surface of sleeve 65 a neat sliding fit in the bore 62 of the lower part 60b such that, as motor 38 (48) is operated stepwise to draw the secondary lift table 36' (46') axially within bore 62 in either direction, the sleeve is drawn axially within bore 61 in the same direction. A flange 68 around the upper end of liner sleeve 65 is a neat sliding fit in the bore 61 of the upper part 61 of housing 60, with piston rings 69 in flange providing a seal against the passage of powder. Secured over the upper end of liner sleeve 65, and movable with sleeve 65, there is provided a primary lift table 36 (46) the, in the case of build device 30 also is referred to as the build table.

The re-coater system 28 that includes the re-coater device 29, operable to form successive layers of metallic powder over the area of the upper surface containing the build area 27, is shown in FIGS. 11 to 13. The re-coater system 28 is mounted in an upper extent of the front housing 16, over the upper surface 22a of the support structure 22. The re-coater system 27 preferably is at a level between the level of the upper surface 22a of the support structure 22 and level of the laser beam radiation source 26. The re-coater system 28 includes a carriage 70 from which the re-coater device 29 depends, a rail system 72 along which the carriage 70 is movable and a drive system 74 by which the carriage is movable in one or other direction, as required, along the rail system 72. The arrangement is such that, with the drive system 74 moving the carriage 70 in one direction along the rail system 72, the re-coater device 29 is moved with the carriage from a start position to move powder along the upper surface 22a of the support structure 22 and thereby form a layer of powder over the upper surface, including the build area 27, and with the drive system 74 moving the carriage 70 in the other direction, the re-coater device 29 is returned to the start position. In relation to the upper surface 22a as viewed in FIGS. 6 and 7, the start position for the re-coater device 29 is to the side of dosing device 40 further from the build device 30. Thus, with powder presented to the level of surface 22a by the dosing unit 40, the re-coater device is able to move from the start position to move and spread the powder to form a layer along surface 22a, to and beyond the build area 27 over the build device 30 to the overflow vessel 50.

The arrangement is such that the re-coater device 29 is able to pass between the radiation source 26 and the build area 27 of the horizontal plane defined by the upper surface 22a of the support structure 22 only between periods of operation of the radiation source. Thus, so no part of the re-coater system 28 is between the radiation source 26 and the build area 27 while the radiation source 26 is operable to focus a laser beam on predetermined regions of the build area 27. To enable this, the rail system 72 has a substantially parallel pair of rails or linear slides 76 each located to a respective side of the path traversed by the carriage 70 in its movement along the rails or linear slides 76. The carriage 70 is mounted in relation to, and extend between, each of the rails or linear slides 76, with the re-coater device 29 depending below the carriage 70 and extending from adjacent to one to adjacent the other rail or linear slide 76. The re-coater device 29 has an elongate body 77 along a lower face of which a wiper blade or element 78 is attached. The body 77 is adjustably secured at each of its opposite ends to a respective side of the carriage 70 such that the wiper blade or element 78 can be adjusted to a required, uniform spacing along its length from the surface 22a of the support stricture 22, required for forming layers of powder of a required, uniform thickness.

The drive system 74 of the re-coater system 28 preferably comprise a stepper motor 80, such as a NEMA® 34 servo motor mentioned earlier herein, having an output shaft 80 a. The system 74 also includes a transmission 82 operable between motor 80 and each of a parallel pair of threaded drive shafts 83. Each shaft 83 is in threaded engagement with the carriage 70 along a respective side, with each shaft 83 extending along and supported for rotation in or on a respective rail or linear slide 76 of the rail system 72. The linear motor 80 is mounted on a bracket 85 extending adjacent one end of the rail system 72, with the output shaft 80 a drivingly engaged with each drive shaft 82 via a gear system 86 comprising transmission 82. The gear system 86 includes a gear 87 on the output shaft 80 a of the linear motor 80, a respective gear 88 on the end of each drive shaft 83, and a toothed drive belt 89 meshing with the gear 87 on the output shaft 80 a of motor 80 and the respective gear 88 on each drive shaft 83.

In the installation of the invention, a protective atmosphere preferably is able to be maintained in the front housing 16 by a closed-circuit system 90 shown in FIGS. 13 and 14. The system 90 enables the recirculation, extraction and filtration of protective gas, in maintaining an atmosphere of protective gas throughout the interior of front housing 16, as is necessitated by front housing 16 comprising the overall main chamber in which a build operation is fully contained. The recirculation system 90 enables a flow of protective gas across at least the build area 27, between an inlet fitting 92 and an outlet fitting 93 in a closed circuit including a first filter 94 and a second filter 95 and a blower 96 by which the gas is circulated around the closed circuit of the system 90. Fume, generated in heating of powder of the layer over the build area 27 by the laser beam, can be extracted from the front housing 16 with the gas, together with any entrained powder particles, by which suction generated at outlet fitting 93 by the blower 96. The extracted gas with fume and entrained particles is drawn to, and through, the filters 94 and 95 by the blower 96 to enable removal of the fume and particles, to generate refreshed gas which then is re-circulated to the front housing 16 via the inlet fitting 92.

The front housing 16 is relatively shallow in its front to rear depth requirements for accommodating the side-by-side spacing of the overflow chamber 50 and the build and dosing devices 30 and 40. As a consequence, the upper sub-housing is able to include a rear section comprising the rear housing 19 which is able to accommodate much of the closed-circuit system 90, such as the filters 94 and 95, the blower 96 and much of the ducting completing the gas flow path from the outlet fitting 93 to the inlet fitting 92. Thus, most electronic components can be accommodated in less constrained conditions within the lower sub-housing, thereby facilitating servicing and repair, and simplifying cooling requirements.

A flow of protective gas across the build area, between inlet fitting 92 and outlet fitting 93, most conveniently is provided by the inlet and outlet fittings being spaced across build area in a direction perpendicular to the spacing along the surface 22a of support structure 22 from dosing device 50, across build device 30 to overflow vessel 50 between the first location and the build area. The front housing 16 has a front access opening provided with front door 17, movable between an open position shown in FIGS. 1 and 2, enabling access to the interior of main chamber 18, and a closed position in which the door 17 covers and seals the access opening to preclude access to chamber 18. The spacing between the inlet and outlet fittings 92, 93 perpendicular to the spacing between dosing device 50 and overflow vessel 50 is such that one of the fittings 92, 93, in this instance the outlet fitting 93, is adjacent to the access opening. While other arrangements are possible, as detailed above before reference to the heading "Broad Description of the Drawings", one possible arrangement is illustrated in FIGS. 1 to 4, 13 and 14. In that arrangement, the outlet fitting 93 is not only adjacent to the opening but also it is mounted on or in relation to, and movable with, the front door 17. To enable this, a thin hollow casing 98 that incorporates the outlet fitting 93 is mounted on the door to form with the inner surface of the door 17 a flow passage for gas flowing from the main chamber 18 via the outlet fitting 93. The casing 98 is mounted at a position on the upper extent of the door 17 to align the fitting 93 with an inlet fitting 92 installed to the rear of the main chamber 18 of the front housing 16. The casing 98 has an outlet port 99 that, when the door is closed, provides a seal between the port 99 and an adjacent end of a conduit section 100 forming part if the flow circuit leading to the filters 94 and 95. When the door 17 is opened, the seal between port 99 and conduit section 100 is broken, but unobstructed access to the main compartment 18 is enabled.

The invention claimed is:

1. A unitary build device that is releasably mountable within an enclosure of an installation for use in additive manufacturing of a component by SLM or SLS in accordance with three-dimensional CAD data of a model of the component, the unitary build device being releasably engageable with a support structure within the enclosure so as to extend below a build area of a horizontal plane defined by an upper surface of the support structure with the unitary build device accessible through the support structure at the upper surface, the unitary build device comprising:

(a) a build body that has a cylindrical housing, the cylindrical housing closed at a lower end of the build body and having an inner surface that defines an elongate build chamber, the elongate build chamber accessible from an opening at an upper end of the cylindrical housing;

(b) a build lift table contained and axially adjustable in the cylindrical housing within an upper part of the elongate build chamber;

(c) a build piston head contained and axially adjustable in the cylindrical housing within a lower part of the elongate build chamber;

(d) a build sleeve co-axially contained and axially adjustable in the cylindrical housing the build sleeve extending within the elongate build chamber between the upper part and the lower part of the elongate build chamber and spacing the build lift table from the build piston head, the build sleeve forming an integral unit with the build lift table and the build piston head with an upper end of the build sleeve secured to the build lift table and a lower end of the build sleeve secured to the build piston head, the integral unit is axially adjustable with at least a lower part of the build sleeve having a sliding fit with the inner surface of the build body in the lower part of the elongate build chamber and with clearance from the inner surface of the build body in the upper part of the elongate build chamber, the build lift table or a peripheral flange around the upper end of the build sleeve having a sliding fit with the inner surface of the build body in the upper part of the elongate build chamber; and (e) an electric drive build motor contained in the cylindrical housing and mounted coaxially within a lower extent of the cylindrical housing, the the electric drive build motor having an axially extendable and retractable output shaft with the build piston head mounted in threaded engagement on the output shaft for axial movement of the integral unit in the elongate build chamber as the output shaft extends and retracts;

the the electric drive build motor operable to reversibly adjust the integral unit in the elongate build chamber to:

(a) stepwise lower the build lift table away from an upper position in the upper part of the elongate build chamber to a lower position in the upper part of the elongate build chamber, the upper position adjacent to the opening at the upper end of the cylindrical housing, to enable the component progressively being built layer by layer by an SLM or SLS production cycle to be lowered stepwise in the upper part of the elongate build chamber, and simultaneously adjust the build piston head stepwise away from an upper position in the lower part of the elongate build chamber to a lower position in the lower part of the elongate build chamber, with stepwise lowering of the build sleeve in the lower part of the elongate build chamber, the upper position for the build piston head lower in the elongate build chamber than the lower position for the build lift table, and (b) adjust the build lift table and the build piston head away from the respective lower position to the respective upper position to enable the component built by the SLM or SLS production cycle to be raised in the upper part of the elongate build chamber for recovery through the opening at the upper end of the cylindrical housing, with an upper portion of the build sleeve advancing into the upper part of the elongate build chamber.

2. A unitary dosing device that is releasably mountable within an enclosure of an installation for use in additive manufacturing of a component by SLM or SLS in accordance with three-dimensional CAD data of a model of the component, the unitary dosing device being releasably engageable with a support structure within the enclosure so as to extend below a dosing area of a horizontal plane defined by an upper surface of the support structure with the unitary dosing device accessible through the support structure at the upper surface, the unitary dosing device comprising:

(a) a dosing body that has a cylindrical housing, the cylindrical housing closed at a lower end of the dosing body and having an inner surface that defines an elongate dosing chamber, the elongate dosing chamber accessible at an opening at an upper end of the cylindrical housing;

(b) a dosing lift table contained and axially adjustable in the cylindrical housing within an upper part of the elongate dosing chamber;

(c) a dosing piston head contained and axially adjustable in the cylindrical housing within a lower part of the elongate dosing chamber:

(d) a dosing sleeve co-axially contained and axially adjustable in the cylindrical housing, the dosing sleeve extending within the elongate dosing chamber between the upper part and the lower part of the elongate dosing chamber and spacing the dosing lift table from the dosing piston head, the dosing sleeve forming an integral unit with the dosing lift table and the dosing piston head with an upper end of the dosing sleeve secured to the dosing lift table and a lower end of the dosing sleeve secured the dosing piston head, the integral unit is axially adjustable with at least a lower part of the dosing sleeve having a sliding fit with the inner surface of the dosing body in the lower part of the elongate dosing chamber and with clearance from the inner surface of the dosing body in the upper part of the elongate dosing chamber, the dosing lift table or a peripheral flange around the upper end of the dosing sleeve having a sliding fit with the inner surface of the dosing body in the upper part of the elongate dosing chamber; and (e) an electric drive dosing motor contained in the cylindrical housing and mounted coaxially within a lower extent of the cylindrical housing, the electric drive dosing motor having an axially extendable and retractable output shaft with the dosing piston head mounted in threaded engagement on the output shaft for movement of the integral unit as the output shaft extends and retracts:

the electric drive dosing motor operable to reversibly adjust the integral unit in the elongate dosing chamber to:

(a) adjust the dosing lift table away from an upper position in the upper part of the elongate dosing chamber to a lower position in the upper part of the elongate dosing chamber, the upper position adjacent to the opening at the upper end of the cylindrical housing to enable a quantity of powder for manufacture of the component by an SLM or SLS production cycle to be received into the upper part of the elongate dosing chamber, and simultaneously adjust the dosing piston head stepwise away from an upper position in the lower part of the elongate dosing chamber to a lower position in the lower part of the elongate dosing chamber, with lowering of the dosing sleeve in the lower part of the elongate dosing chamber, the upper position for the dosing piston head lower in the elongate dosing chamber than the lower position for the dosing lift table, and (b) stepwise adjust the dosing lift table and the dosing piston head away from the respective lower position to the respective upper position to enable successive layers of powder to be exposed at the opening at the upper end of the cylindrical housing and transferred in turn for use in an SLM or SLS production cycle, with an upper portion of the dosing sleeve advancing into the upper part of the elongate dosing chamber.

3. An installation for use in additive manufacturing of a component by SLM or SLS in accordance with three-dimensional CAD data of a model of the component, the installation comprising:

an enclosure within and throughout which a protective atmosphere of a protective gas can be maintained during a cycle for production of the component;

a support structure that is mounted within the enclosure, intermediate of and spaced from top and bottom levels of the enclosure, and that defines an upper surface disposed in a horizontal plane;

a laser beam radiation source operable for focusing a laser beam down onto predetermined regions of a build area of the horizontal plane; and a re-coater device operable to form successive layers of metallic powder over an area of the upper surface containing the build area;

the installation is operable to apply the laser beam from the laser beam radiation source, to each of the successive layers of metallic powder in turn before formation of a next layer of the successive layers, in a given part of the build area corresponding to a respective selected cross-sectional area of a model of the component before formation of the next layer, to sinter or melt the metallic powder in a heated area of each layer at a point of contact by the laser beam and then able to rapidly solidify and fix to a preceding layer below to form a respective layer of the component being built; and the installation further including, at a first location, the unitary build device according to claim 1 operable to receive the successive layers of metallic powder for exposure of the metallic powder to the applied laser beam.

4. The unitary build device of claim 1, wherein the unitary build device is adapted to be engaged in, or lifted from, the enclosure by the build body of the unitary build device engaging with, or disengaging from, the support structure without reassembly or disassembly of the unitary build device other than to connect or disconnect any external power supply for the electric drive build motor.

5. The unitary build device of claim 1, wherein piston rings are provided on the peripheral flange to seal against powder passing beyond the build lift table from the upper part of the elongate build chamber.

6. The installation of claim 3, wherein at a second location spaced beyond the build area in a direction away from the first location at which the unitary build device is positioned, the installation has an open topped vessel that defines an overflow chamber and mounted in relation to the support structure within the elongate build chamber, intermediate of the top and bottom levels, such that the overflow chamber extends below the support structure, with an open top of the open topped vessel in the horizontal plane such that powder surplus to requirements in the re-coater device forming each of successive layers of powder over the upper surface to the second location is received into the overflow chamber, and the overflow chamber is releasably mounted in relation to the support structure such that the overflow chamber is separable from the installation to be emptied or replaced by another overflow chamber for a change of powder to be used in a next component build cycle.

7. The installation of claim 3, wherein the support structure includes a shelf that has an upper surface that defines the horizontal plane, and wherein the shelf has a U-shaped opening for the unitary build device along a side of the shelf, and wherein the unitary build device has a collar around the opening at the upper end of the cylindrical housing, and an upper extent of the unitary build device is laterally receivable into the U-shaped opening and is a neat fit in the opening with an upper surface of the collar in the horizontal plane.

8. The installation of claim 7, wherein the unitary build device has a handle by which the unitary build device is manually maneuverable to be released from and returned to the support structure.

9. The installation of claim 3, wherein the re-coater device is part of a re-coater system that includes a carriage from which the re-coater device depends, a rail system along which the carriage is movable and a drive system by which the carriage is movable in one or other direction along the rail system, the drive system to move the carriage in one direction along the rail system to move the re-coater device with the carriage from a start position to move powder along the upper surface of the support structure and form a layer of powder over the upper surface, including the build area, and the drive system to move the carriage in the other direction to return the re-coater device to the start position.

10. The installation of claim 9, wherein the re-coater system is mounted in an upper extent of the enclosure, over the upper surface of the support structure, at a level between the upper surface of the support structure and the laser beam radiation source, and the re-coater device is able to pass between the the laser beam radiation source and the build area of the horizontal plane defined by the upper surface of the support structure between periods of operation of the the laser beam radiation source, so no part of the re-coater system is between the the laser beam radiation source and the build area while the the laser beam radiation source is operable to focus the laser beam on predetermined regions of the build area.

11. The installation of claim 10, wherein the rail system has a parallel pair of rails or linear slides with each of the rails or linear slides located to a respective side of a path traversed by the carriage as the carriage moves along the parallel rails or linear slides, the carriage is mounted in relation to, and extends between, each of the rails or linear slides of the parallel pair thereof, and the re-coater device depends below the carriage to extend from adjacent to a first rail or linear slide of the pair to adjacent a second rail or linear slide of the pair, the re-coater device having an elongate body along which a wiper blade is attached to a lower face of the elongate body.

12. The installation of claim 9, wherein the drive system of the re-coater system includes a stepper motor having a threaded output shaft in threaded engagement with the carriage and extending along and supported for rotation in or on the rail system.

13. The installation of claim 9, wherein the drive system of the re-coater system includes a stepper motor having an output shaft engaged with each of a parallel pair of threaded drive shafts, with each threaded drive shaft threadedly engaged with the carriage and extending along and supported for rotation in or on a respective rail or linear slide of the rail system.

14. The installation of claim 13, wherein the stepper motor is mounted on a bracket extending adjacent one end of the rail system, with the output shaft of the stepper motor drivingly engaged with each drive shaft by a gear system including a gear on the output shaft of the stepper motor engaged with a respective gear on the end of each drive shaft, by direct engagement or by a toothed drive belt meshing with the gear on the output shaft and the respective gear on each drive shaft.

15. The installation of claim 3, wherein a flow of the protective atmosphere of the protective gas is able to be maintained in the enclosure by a closed-circuit system for recirculation, extraction and filtration of the protective gas, with the closed-circuit system operable to maintain the atmosphere of the protective gas throughout the enclosure including the upper part of the elongate build chamber and to enable a flow of the protective gas across the build lift table, between an inlet fitting and an outlet fitting, and fume generated in heating of powder of the layer over the build area by the laser beam can be extracted, together with any entrained powder particles, with the fume and entrained particles filtered from the protective gas before the protective gas is re-circulated within the enclosure.

16. The installation of claim 15, wherein the flow of protective atmosphere of the protective gas across the build area, between the inlet fitting and the outlet fitting, is enabled by the inlet fitting and the outlet fitting being spaced across the build area in a direction perpendicular to spacing between the first location and the build area.

17. The installation of claim 16, wherein the enclosure in which the protective atmosphere of the protective gas is to be maintained has an access opening in one side and a door movable between an open position enabling access to an interior of the enclosure and a closed position in which the door covers the access opening to preclude access to the interior, with spacing between the inlet fitting and the outlet fitting perpendicular to the spacing between the first location and the build area such that either the inlet fitting or the outlet fitting is adjacent to the opening respectively to receive or discharge the flow of the protective gas across the build area.

18. The installation of claim 17, wherein the inlet or outlet fitting adjacent to the opening is mounted on or in relation to the door and movable with the door, with the inlet fitting or the outlet fitting able to be in communication with a conduit that forms part of a flow path of the closed-circuit system and that extends to or from the inlet fitting or the outlet fitting across an inner face of the door or within the door, with the conduit able to disconnect from, and reconnect with, an associated part of the closed-circuit system as the door is opened, or closed, respectively.

19. The installation of claim 3, wherein the unitary build device is adapted to be engaged in, or lifted from, the enclosure by the build body of the unitary build device engaging with, or disengaging from, the support structure without any requirement for reassembly or disassembly of the unitary build device other than to connect or disconnect any external power supply for actuating the electric drive build motors.

* * * * *